UNITED STATES PATENT OFFICE.

HERMAN E. STURCKE, OF JAMAICA, NEW YORK, ASSIGNOR TO THE AETNA CHEMICAL COMPANY, OF NEW YORK, N. Y.

PREPARING SULFATE OF LIME FROM RESIDUES.

SPECIFICATION forming part of Letters Patent No. 601,006, dated March 22, 1898.

Application filed November 4, 1897. Serial No. 657,347. (Specimens.)

*To all whom it may concern:*

Be it known that I, HERMAN EDWARD STURCKE, a citizen of the United States, residing at Jamaica, county of Queens, and State of New York, have invented a certain new and useful Process of Preparing Chemically-Pure Sulfate of Lime from the Lime Residues Obtained in the Manufacture of Caustic Soda, of which the following is a specification.

My improved process particularly relates to obtaining chemically-pure sulfate of lime from the residues resulting from the manufacture of caustic soda and caustic potash by treating soda-ash or potash solutions with caustic lime. Such residues at the present time are not only valueless to manufacturers, but are difficult to dispose of, since for sanitary reasons they cannot be admitted to the sewer, and they therefore necessitate cartage for sometimes considerable distances. These residues are therefore at the present time a source of expense, rather than of profit.

My improved process is also adapted for use in the treatment of residues resulting from ammonia-soda processes wherein both the caustic and carbonate processes are carried out, by which are obtained as waste products a lime residue and calcium chlorid, said waste products being at the present time also valueless and difficult of disposal.

By my improved process I treat these residues and obtain therefrom chemically-pure sulfate of lime which is capable of many industrial uses—such, for instance, as a paper-filler. The improved process is capable of being economically carried out, so that the residues referred to can now be commercially utilized and will result in considerable profit to the manufacturers.

In carrying out my invention for the treatment of the residues resulting from the manufacture of caustic soda I proceed as follows: The lime residue, which consists largely of carbonate of lime with some intermixed hydrated or caustic lime therewith, together with impurities—such as coal, sand, dirt, &c.—is dissolved in muriatic acid. The resulting solution of muriate of lime or calcium chlorid is filtered through the finest possible mesh, so as to reject all of the insoluble impurities. This filtration may be carried out in a suitable filter-press or in any other way. The clear calcium-chlorid solution after this filtration is treated with sulfuric acid, the reaction precipitating pure sulfate of lime, which sulfate is filtered off, carefully washed to remove all traces of muriatic acid, and suitably dried or sold in moist or paste form. The filtrate from the sulfate of lime, which consists of a solution of muriatic acid with a small amount either of free sulfuric acid or of undecomposed calcium chlorid and some sulfate of lime, is neutralized with new quantities of the lime residue. If a sufficient excess of lime residue is employed and the solution again filtered, all impurities, such as iron and alumina salts, are precipitated and removed from the solution, which contains calcium chlorid and a small amount of sulfate of lime. This calcium-chlorid solution is again precipitated with sulfuric acid, the sulfate of lime filtered off, and the filtrate again neutralized with an excess of the lime residue.

The operations thus referred to are repeated indefinitely and the reactions are represented by the following equations:

$$CaCO_3 + 2HCl = CaCl_2 + H_2O + CO_2.$$

$$CaCl_2 + H_2SO_4 = CaSO_4 + 2HCl.$$

$$2HCl + CaCO_3 = CaCl_2 + H_2O + CO_2.$$

$$CaCl_2 + H_2SO_4 = CaSO_4 + 2HCl.$$

These equations show that theoretically a given amount of muriatic acid is sufficient to make an infinite amount of sulfate of lime in the manner indicated; but in practice I find that about ten per cent. of the muriatic acid is wasted, which must be supplied as the several operations are repeated.

Instead of starting with muriatic acid and dissolving lime residue therein, as will be the case in the treatment of residues obtained from the manufacture of caustic soda, a chlorid-of-calcium solution may be used, precipitated with sulfuric acid, forming sulfate of lime and muriatic acid. In the manufacture of carbonate of soda by treating chlorid of soda with caustic ammonia and carbonic acid, the resulting ammonia chlorid being treated with caustic lime, so as to again produce caustic ammonia, calcium chlorid as a residue is formed, which at the present time is not only valueless, but a source of inconvenience to the manufacturers. If in connection with the same carbonate process the manufacturer carries on a caustic process for producing caustic soda by treating carbonate of soda with caustic lime, a lime residue such as referred to will be produced. These two residues can be commercially utilized for the production of chemically-pure sulfate of lime in accordance with the process which I have above outlined, the calcium-chlorid solution and the lime residue of the two processes being combined and being treated with sulfuric acid to produce the sulfate of lime, as I have indicated.

Having now described my invention, what I claim as new, and desire to secure by Letters Patent, is as follows:

1. The process of treating residues resulting in the manufacture of caustic soda and which comprise essentially carbonate of lime, said process consisting in dissolving the residues in muriatic acid to form a calcium-chlorid solution, in filtering said solution, in precipitating the clear filtrate with sulfuric acid to form sulfate of lime, in filtering off said sulfate, and in using the filtrate from the second filtration for treating fresh quantities of the lime residues, substantially as set forth.

2. The process of treating residues resulting in the manufacture of caustic soda and which comprise essentially carbonate of lime, said process consisting in dissolving the residues in muriatic acid to form a calcium-chlorid solution, in filtering said solution, in precipitating the clear filtrate with sulfuric acid to form sulfate of lime, in filtering off said sulfate, in using the filtrate from the second filtration for treating fresh quantities of the lime residues, and in finally washing the sulfate of lime to remove traces of muriatic acid, substantially as set forth.

3. The process of treating residues resulting in the manufacture of caustic soda and which comprise essentially carbonate of lime, said process consisting in dissolving the residues in muriatic acid to form a calcium-chlorid solution, in filtering said solution, in precipitating the clear filtrate with sulfuric acid to form sulfate of lime, in filtering off said sulfate, in using the filtrate from the second filtration for treating fresh quantities of the lime residues, in washing the sulfate of lime to remove traces of muriatic acid, and finally drying said sulfate, substantially as set forth.

4. The process of preparing sulfate of lime, consisting in filtering a calcium-chlorid solution, such as the waste product from the ammonia-soda process, precipitating the filtrate with sulfuric acid to form sulfate of lime, in filtering off said sulfate, in using the filtrate from the second filtration for dissolving lime residues resulting in the manufacture of caustic soda, in washing the sulfate of lime to remove traces of muriatic acid, and finally drying said sulfate, substantially as set forth.

This specification signed and witnessed this 27th day of October, 1897.

HERMAN E. STURCKE.

Witnesses:
FRANK L. DYER,
EUGENE CONRAN.